United States Patent
Sosna et al.

(10) Patent No.: US 10,419,566 B2
(45) Date of Patent: Sep. 17, 2019

(54) SYSTEM AND METHOD FOR DISPLAYING AR CONTENT

(71) Applicant: Veeva Systems Inc., Pleasanton, CA (US)

(72) Inventors: Arno Sosna, Pleasanton, CA (US); Timothy S. Murphy, Berkeley, CA (US); Martti Juotasniemi, Pleasanton, CA (US); Srinivasa S. Davuluri, San Ramon, CA (US)

(73) Assignee: Veeva Systems Inc., Pleasanton, CA (US)

(*) Notice: Subject to any disclaimer, the term of this patent is extended or adjusted under 35 U.S.C. 154(b) by 0 days.

(21) Appl. No.: 15/885,623

(22) Filed: Jan. 31, 2018

(65) Prior Publication Data

US 2019/0230177 A1    Jul. 25, 2019

Related U.S. Application Data

(63) Continuation of application No. 15/879,358, filed on Jan. 24, 2018, now Pat. No. 10,225,360.

(51) Int. Cl.
| | |
|---|---|
| *G06F 15/16* | (2006.01) |
| *H04L 29/08* | (2006.01) |
| *G06T 19/00* | (2011.01) |
| *G06F 3/0484* | (2013.01) |
| *G06F 3/0481* | (2013.01) |
| *G06F 3/0482* | (2013.01) |

(52) U.S. Cl.
CPC ........ *H04L 67/2804* (2013.01); *G06F 3/0482* (2013.01); *G06F 3/0484* (2013.01); *G06F 3/04815* (2013.01); *G06T 19/006* (2013.01)

(58) Field of Classification Search
CPC ............ H04L 67/2804; G06F 3/04815; G06F 3/0482; G06F 3/0484; G06T 19/006
USPC ........................................................ 709/246
See application file for complete search history.

(56) References Cited

U.S. PATENT DOCUMENTS

| | | | |
|---|---|---|---|
| 8,401,902 B1 | 3/2013 | Stone et al. | |
| 8,494,838 B2 | 7/2013 | Donabedian et al. | |
| 8,918,447 B2 | 12/2014 | Frick et al. | |
| 9,154,735 B2 | 10/2015 | Periyannan et al. | |
| 9,165,307 B2 | 10/2015 | Scott et al. | |
| 9,183,560 B2 | 11/2015 | Abelow | |
| 9,614,933 B2 | 4/2017 | Jwalanna | |
| 9,641,532 B2 | 5/2017 | Murphy et al. | |
| 9,721,394 B2* | 8/2017 | Rosenthal | H04N 21/41407 |
| 9,762,553 B2 | 9/2017 | Ford et al. | |
| 9,823,813 B2 | 11/2017 | Beechuk et al. | |
| 9,824,082 B2 | 11/2017 | Agrawal et al. | |
| 9,886,162 B2* | 2/2018 | Berelejis | G06K 9/00671 |
| 9,900,302 B2* | 2/2018 | Wood | H04L 63/08 |

(Continued)

*Primary Examiner* — Melvin H Pollack

(57) ABSTRACT

The system and method described allow AR content to be packaged according to the CLM packaging structure and loaded to a content management system without coding, and allow the AR content to be viewed directly with a CLM content player without requiring build or patch distribution processes. The content creator may define a standard configuration with a JSON file based on the guidelines and parameters of the CLM packaging structure. Users may view and place AR content over a physical world video using a camera in a user computing device, and move, rotate, zoom in and zoom out the AR content.

18 Claims, 9 Drawing Sheets

(56) References Cited

U.S. PATENT DOCUMENTS

| | | | |
|---|---|---|---|
| 9,912,994 B2 | 3/2018 | James et al. | |
| 9,918,183 B2 | 3/2018 | Rhoads et al. | |
| 9,930,174 B2 * | 3/2018 | Surana | H04M 3/42323 |
| 9,940,341 B2 | 4/2018 | Depaoli et al. | |
| 9,986,207 B2 * | 5/2018 | Cronin | H04N 7/157 |
| 10,049,260 B1 * | 8/2018 | Hushchyn | G06K 9/00255 |
| 10,096,161 B2 * | 10/2018 | Callaghan | G06T 19/006 |
| 10,102,316 B2 * | 10/2018 | Van der Velden | G06F 17/5009 |
| 10,109,041 B2 * | 10/2018 | Summers | G06Q 10/10 |
| 10,109,107 B2 * | 10/2018 | Knorr | G06T 19/006 |
| 10,129,476 B1 * | 11/2018 | Hushchyn | H04N 5/23254 |
| 2012/0047223 A1 | 2/2012 | Tarkoma | |
| 2013/0030872 A1 | 1/2013 | Oksman | |
| 2013/0076788 A1 | 3/2013 | Zvi | |
| 2014/0232748 A1 | 8/2014 | Kis et al. | |
| 2015/0040074 A1 | 2/2015 | Hofmann et al. | |
| 2015/0163206 A1 | 6/2015 | McCarthy et al. | |
| 2015/0215355 A1 | 7/2015 | Moyers et al. | |
| 2015/0310446 A1 | 10/2015 | Tuchman et al. | |
| 2016/0342312 A1 | 11/2016 | Jiang et al. | |
| 2017/0005999 A1 | 1/2017 | Choyi et al. | |
| 2017/0041296 A1 | 2/2017 | Ford et al. | |
| 2017/0123614 A1 | 5/2017 | Perlegos et al. | |
| 2017/0132567 A1 | 5/2017 | Glunz | |
| 2017/0237789 A1 | 8/2017 | Harner et al. | |
| 2017/0270702 A1 * | 9/2017 | Gauthier | G06F 8/38 |
| 2017/0293356 A1 * | 10/2017 | Khaderi | A63F 13/212 |
| 2017/0301142 A1 | 10/2017 | Gentilin et al. | |
| 2017/0344223 A1 * | 11/2017 | Holzer | G06K 9/00664 |
| 2017/0358048 A1 * | 12/2017 | Kotake | G06T 1/0007 |
| 2017/0371876 A1 | 12/2017 | Bailey | |
| 2018/0012309 A1 | 1/2018 | Raskin et al. | |
| 2018/0020204 A1 * | 1/2018 | Pang | H04N 13/344 |
| 2018/0074806 A1 | 3/2018 | Brooks et al. | |
| 2018/0095634 A1 | 4/2018 | Alexander | |
| 2018/0140942 A1 * | 5/2018 | Miller | A63F 13/211 |
| 2018/0176483 A1 * | 6/2018 | Knorr | G06T 19/006 |
| 2018/0176730 A1 * | 6/2018 | Szymczyk | H04W 4/022 |
| 2018/0217429 A1 * | 8/2018 | Busch | G02F 1/1395 |
| 2018/0240276 A1 * | 8/2018 | He | G06T 3/0087 |
| 2018/0276863 A1 * | 9/2018 | Nerurkar | G01C 21/00 |
| 2018/0276895 A1 * | 9/2018 | Hodge | G09G 5/003 |
| 2018/0278462 A1 * | 9/2018 | Bjontegard | H04L 41/044 |
| 2018/0293517 A1 * | 10/2018 | Browne | G06Q 10/00 |
| 2018/0300118 A1 * | 10/2018 | Zheng | G06F 9/44 |
| 2018/0300940 A1 * | 10/2018 | Sakthivel | G06T 15/06 |
| 2018/0308289 A1 * | 10/2018 | Srinivasan | G06T 19/006 |
| 2018/0316928 A1 * | 11/2018 | Jain | H04N 19/46 |
| 2018/0321672 A1 * | 11/2018 | Cella | G05B 23/0297 |
| 2018/0322674 A1 * | 11/2018 | Du | G06T 11/60 |

* cited by examiner

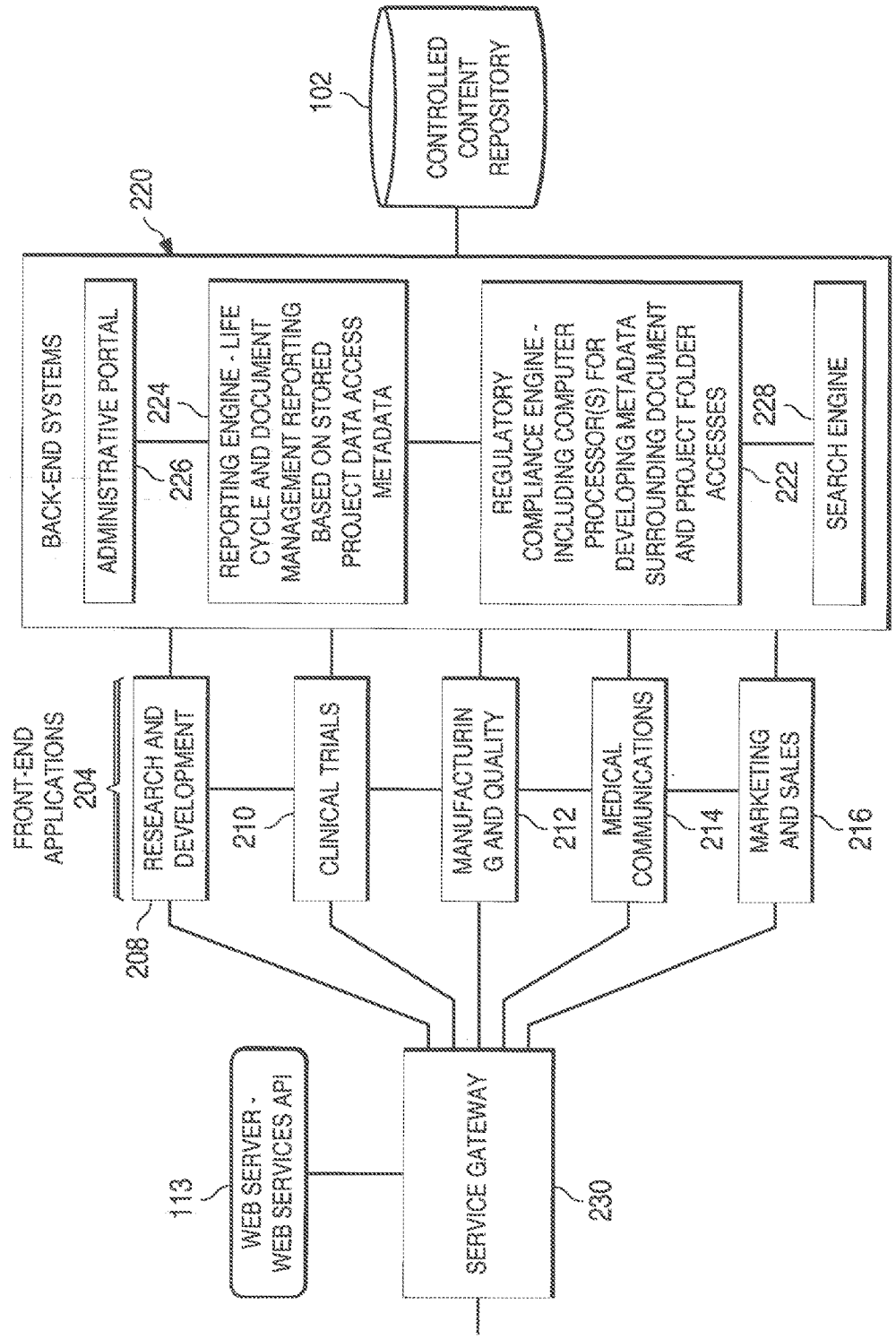

- Back
- Edit
- Record a Call
- Launch Media
- New Medical Inquiry
- Send Email
- Consent Capture
- New Order
- Account Summary
- Custom Reports
- View Hierachy
- Calendar
- Sphere of Influence
- Addresses (2)
- Customer Interactions (27)
- Call Samples (2)
- Multichannel Activities (0)
- Last Update: 7/17/2017, 10:33 AM Antonucci, Rose

| | | | |
|---|---|---|---|
| Name | Rose Antonucci | Gender | F |
| Middle | A | Credentials | MD |
| Suffix | | Specialty | Cardiology |
| Preferred Name | Dr. A | Specialty 2 | General Practice |
| Status | | Primary Parent | Not Available |
| Order Type | All, Transfer | Language | English |
| Default Order Type | | Territory | View |

My Account Info
1107

| | | | |
|---|---|---|---|
| My Target | ☐ | | Route |
| My Detailing Priority | | Day Since Last Call | 14 |
| My Preferred Address | 400 Route 2A Suite E | My Last Activity Date | 7/3/2017 |
| My Preferred Location | | My YTD Activity | 29 |

Key Indicators

| | | | |
|---|---|---|---|
| Preferred Statin | Zostatin | | |
| | | Allowed Product | |
| | | Call Frequency | 24 |

SYSTEM AND METHOD FOR DISPLAYING AR CONTENT

CROSS-REFERENCE TO RELATED APPLICATION

The present application is a continuation application of U.S. nonprovisional patent application Ser. No. 15/879,358, filed on Jan. 24, 2018, entitled System and Method for Distributing AR Content, which is hereby incorporated by reference herein for all purposes.

TECHNICAL FIELD

The present application relates to augmented reality ("AR"), and more specifically to distributing and displaying controlled AR content.

BACKGROUND

In the pharmaceutical sales industry, sales representatives promote products through meetings and other interactions with physicians, including face-to-face meetings and discussions via phone or the Internet. AR content may make interactions with physicians more effective. However, the process for building, testing and delivering AR content requires significant effort and cost, and needs the following steps: designing and building 3D/AR models; coding and compiling an application framework to host the 3D/AR; distributing the application to test organizations; repeating the above process whenever content updates are required; and marketing and distributing content to customers.

In addition, the above process requires at least four distinct skillsets in addition to creating 3D/AR content: UX designers to build an application framework to host the 3D/AR content; software engineers with specific skills on different platforms (iOS, Android, Windows, Java, etc.); QA engineers to test the applications; and DevOps engineers to create distributable applications.

It is desirable to develop a process for delivering AR content to reduce the cost and time to market, and to enable sales representatives to present AR content effectively during interactions with physicians.

SUMMARY

Embodiments disclosed in the present document provide a machine-implemented method for distributing and displaying AR content in a CRM system. The method comprises: receiving a first piece of AR content and a description file of the first piece of AR content, wherein the first piece of AR content and the description file of the first piece of AR content are packaged according to a first packaging structure, wherein the description file of the first piece of AR content describes the first piece of AR content and defines interactions with the first piece of AR content in an AR environment, and wherein an access control rule of an information management system is applied to the first piece of AR content to configure its accessibility by a first user and a second user. The method further comprises: storing the packaged first piece of AR content and the description file of the first piece of AR content in a local storage of a user computing device.

BRIEF DESCRIPTION OF THE DRAWINGS

For a more complete understanding of the present application and its advantages, reference is now made to the following description taken in conjunction with the accompanying drawings, in which like reference numbers indicate like features.

FIG. 2 illustrates an example architecture of the content repository of FIG. 1 in which content is built and organized in a controlled manner that facilitates efficient content generation and alignment;

FIG. 5 illustrates an example user interface for creating a call report;

Although similar reference numbers may be used to refer to similar elements for convenience, it can be appreciated that each of the various example embodiments may be considered to be distinct variations.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Figure 1:
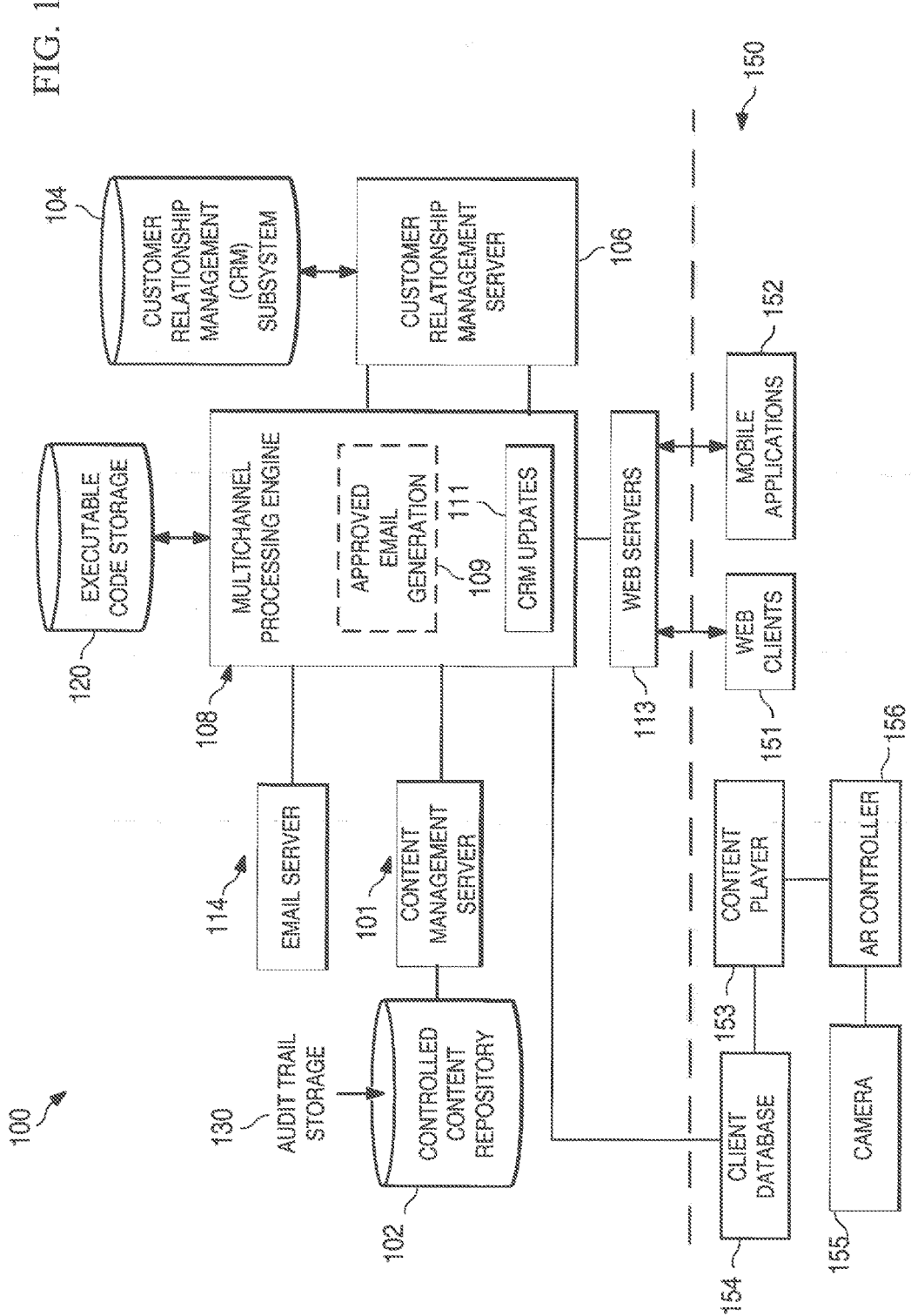
FIG. 1 illustrates an example architecture for distributing AR content wherein the present invention may be implemented.

FIG. 1 illustrates an example architecture 100 for distributing AR content wherein the present invention may be implemented. The presently disclosed embodiment comprises a content management server 101, a controlled content repository 102, a Customer Relationship Management (CRM) server 106, and a multichannel processing engine 108. The customer relationship management server 106 may provide access to a customer relationship management subsystem 104, and the multichannel processing engine 108 may be coupled to the content management server 101, the CRM server 106, and an email server 114. User computing devices, e.g., 150, may communicate with the architecture 100 via a wired or wireless network. In one embodiment, the customer relationship management subsystem 104, and/or the email server 114 may be operated by a third party. The multichannel processing engine 108 may be accessed by users such as company sales representatives through web clients 151 or through mobile apps 152 (such as iOS, Android, Blackberry, or Windows Mobile systems), communicating with the multichannel processing engine 108 through web servers 113. Although the users may be described in the present application as being life science company sales representatives, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, physicians, sales representatives, etc. The content generated in the controlled content repository 102 may be accessed on a regulated basis. This regulated basis may be determined, in part, by the company as a whole and additionally by interaction with data from the customer relationship management subsystem 104, described in further detail below. In one embodiment, approved content, customer profile information, customer preferences, and regulatory limitations and requirements may be stored in a table in the controlled content repository 102. In addition to storage and development of content, the controlled content repository 102 may also store an audit trail 130, tracking exact content of communications as they were sent by the user.

The customer relationship management subsystem 104 contains all contact information that may be available to users. In addition to storage of contact information, the customer relationship management subsystem 104 may also be capable of storing configurations regarding specific preferences, regulatory limitations and requirements, and other fields that will facilitate the generation of appropriate approved electronic communications, in general or on a by-recipient basis. These preferences and/or requirements include both the preferences of the user (e.g., maintaining account lists) as well as the preferences of the enterprise (e.g., employers of the users). In some examples, the approved content may be pre-processed and stored in the controlled content repository 102 and provided to the multichannel processing engine 108 and the customer relationship management subsystem 104. In other examples, the customer relationship management subsystem 104 may have a content management subsystem and may provide the approved content. The customer relationship management subsystem 104 may store content related data, e.g., a link to approved content in the controlled content repository 102.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data and to use that coordinated data for sending approved electronic communications, e.g., emails, in accordance with the system described herein.

Within the customer relationship management subsystem 104, customer accounts may be assigned a set of alignment rules which determine specific pieces of content available for use from the controlled content repository 102. The customer relationship management server 106 may apply these rules. In an embodiment, the multichannel processing engine 108 is responsible for combining the customer account information from the customer relationship management subsystem 104 with content available from the controlled content repository 102, and supply the user with a list of pieces of approved content that may then be sent to a user computing device, e.g., 150.

Communication between the multichannel processing engine 108 and the customer relationship management subsystem 104 may occur via the customer relationship management server 106, which acts as an interface between the two. The customer relationship management server 106 may act solely as an entry and exit point for the customer relationship management subsystem 104. The user may access the multichannel processing engine 108 through either a Web Client 151 or through the mobile apps 152 (such as iOS, Android, Blackberry, or Windows Mobile systems).

A mobile application (e.g., 152) process may be active on the user computing device 150. A corresponding server process may be active on the customer relationship management server 106. The client application process and the corresponding server process may communicate with each other over a network, thus providing distributed functionality and allowing multiple client applications to take advantage of the information-gathering capabilities of the CRM system, including the customer relationship management server 106 and the customer relationship management subsystem 104. The mobile application 152 with its corresponding server process may control the process for generating a call report, as will be described below with reference to FIGS. 3A and 3B.

A local storage device 154 in the user computing device 150 may store a subset of data from the system 100 which may be needed to support operation of the mobile application 152. The local storage device 154 may be synchronized with the system 100 regularly, when the user computing device 150 is back online, and/or when the user requests for synchronization. In one implementation, the local storage device 154 may store a subset of data from the customer relationship management subsystem 104 which is available to a user based on the content access control rule, and AR content from the system 100 (particularly the controlled content repository 102) which is available to the user based on the content access control rule.

Content player 153 is configured to understand the packaging structure of content from the system 100. In one implementation, a number of media types may be defined for the content player 153, e.g., AR content, HTML content or PDFs. When the media type of a piece of content is defined as AR in a description document, the content player 153 may render the AR content, e.g., individual slides within a presentation, and send the rendered content to a AR controller 156. The media type may invoke the AR controller 156 to present AR by combining the AR content from the content player 153 with a real time video from the camera 155. In one implementation, the content player 153 is a closed loop marketing ("CLM") media player, and the AR content is packaged according to a CLM packaging structure and stored in the controlled content repository 102. Closed loop marketing gives sales representatives access to accurate, up-to-date data about a physician before each visit, allowing them to tailor product information to match each physician's patient profile and interests.

Executable code comprises computer readable instructions stored on the computer readable medium (the code storage medium 120). The executable code storage 120 is in communication with the various computing machines in the system 100 such as the customer relationship management server 106 and the multichannel processing engine 108. The same or another executable code storage may be accessed by the previously described components of the controlled content repository 102 for providing separate computer readable code for operating upon by processing machines in that system. In all cases, the code is programmed to perform the functions that are described in the present embodiments and/or additional functions according to system design needs.

FIG. 2 provides a description of the controlled content repository 102 with additional specific applications and interfaces connected thereto. In an embodiment, this controlled content repository 102 is a cloud-based or distributed network based system for consolidating an enterprise's data, oftentimes integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204:

The Research & Development (R&D) front end application 208 provides for an aggregation of materials in support of research and initial clinical trial submissions through building organized and controlled content repositories within the controlled content repository 102. Elements that can be stored, organized, and managed through this front end include submission bills of materials, Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the controlled content repository 102 further provides for efficient passing off of controlled content repository content between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the controlled content repository 102 whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the controlled content repository 102.

The marketing and sales application 216 provides an end-to-end solution for the development, approval, distribution, expiration and withdrawal of promotional materials. Specific features include support for global pieces, approved Form FDA 2253 (or similar international forms) form generation, online document, content to be shared, and video annotation, and a built-in digital asset library (DAL). Again, the communications may be through the controlled content repository 102.

In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 122 may further includes prevalidation functionality to build controlled content in support of installation qualification (IQ) and/or operational qualification (OQ), resulting in significant savings to customers for their system validation costs.

In further disclosed embodiments, the back-end systems 220 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the controlled content repository 102.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching.

In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the event management system 100 such that particular features are usable within the various user screens. For example, and without limitation to any other possible combination of features, in interactions with physicians, the above-described search portal can be used to search for approved content within the controlled content repository 102 which may be then be shared with the physician. And the synergy of combining these particular systems is that the generation of the controlled content can be done in a controlled fashion such that the approved content can be sent to customers with greater confidence in the integrity of the data being sent.

Figure 3A:
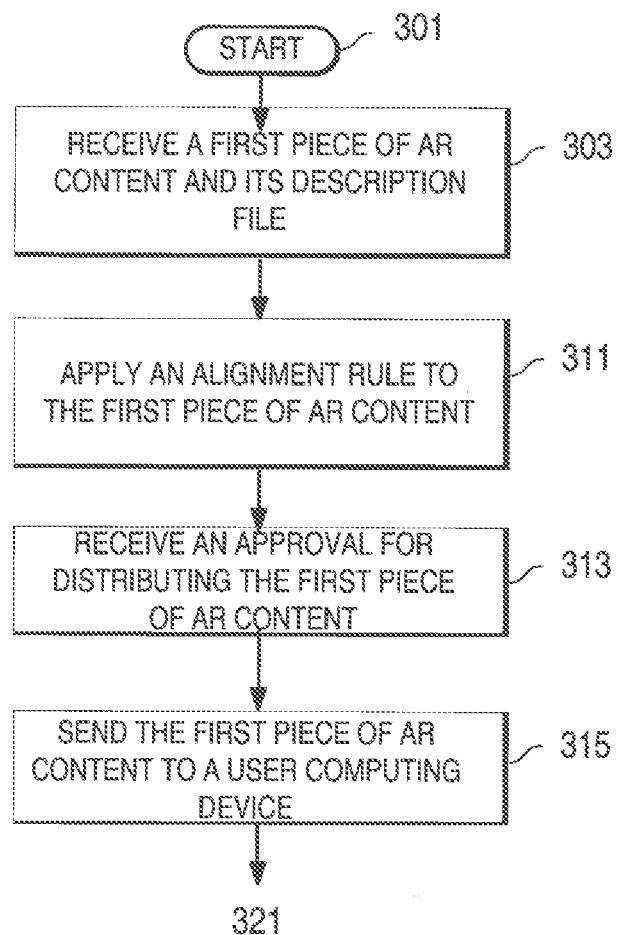
FIGS. 3A and 3B illustrate a flowchart of a method for distributing AR content according to one embodiment of the present invention.
Figure 3B:
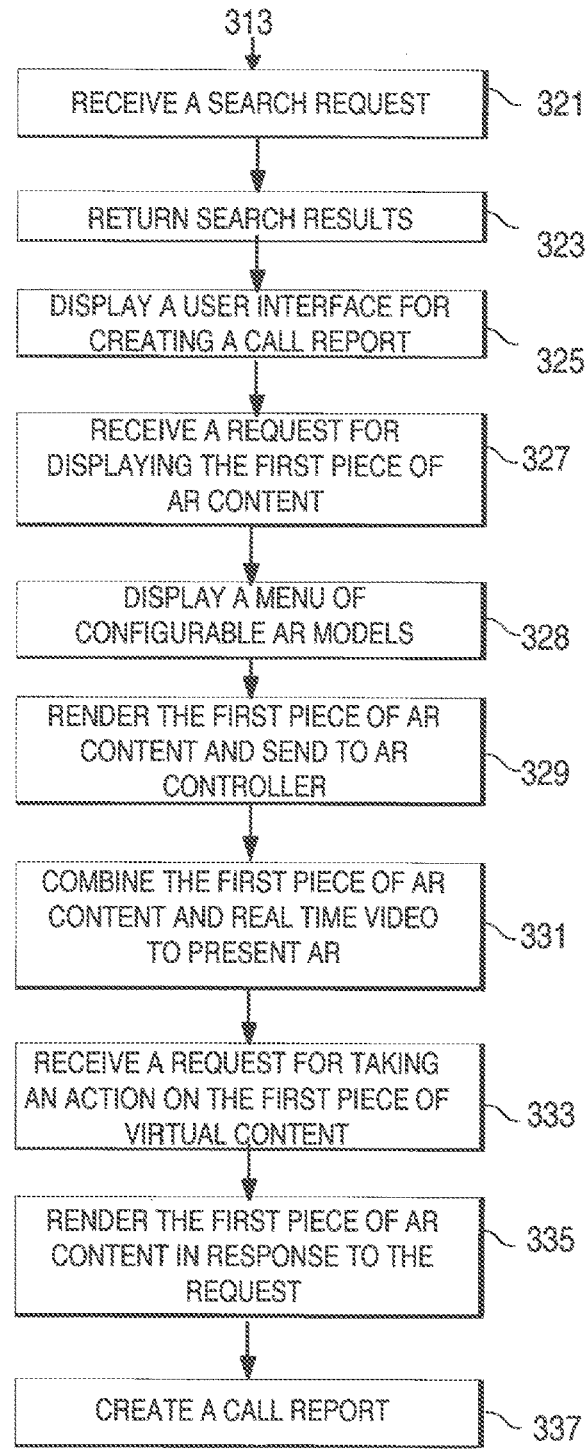

FIGS. 3A and 3B illustrate a flowchart of a method for distributing and displaying AR content according to one embodiment of the present invention. The process may start at 301.

At 303, a first piece of AR content and its description file may be received, e.g., at the controlled content repository 102 from a content creator's computing device.

The AR content may be a piece of 3D content. In one embodiment, the first piece of AR content is converted to the .dae format.

The description file may describe the first piece of AR content, and define interactions with the first piece of AR content and how to manipulate and present the first piece of AR content in an AR environment. The first piece of AR content can only be moved in the way defined in the description file. In one embodiment, the description file may be a JSON file. In one embodiment, the description file may be a scene.json file for creating a content menu and enabling controls of the first piece of AR content in an AR environment, e.g., move, zoom in, zoom out, and rotate. One example of a section of the description file is as follows:

```
{
  "scenes": [
    {"name":"demo. scn",
     "assets":["heart/heart.scn", "skull/skull.scn", "Eye/Eye.scn"],
     "autorotate":{"Heart/Heart.scn": "6", "skull/skull.scn": "12",
```

-continued

```
"Eye/Eye.scn":"15"},
     "interactions":"rotate",
     "menustyle": "right",
     "aliases":["VS12-MC1.jpg"]
    }
    {"name": "demo2.scn",
     "assets":["Heart/Heart.scn", "skull/skull.scn", "Eye/Eye.scn"],
     "interactions": "rotate",
     "menustyle": "right"
    }
  ]
}
```

In the description file above, the AR content is a virtual image of heart, skull or eye, and the action is to rotate the virtual image. Specifically, "assets" may define one or more models included in the model menu of the scene (e.g., heart, skull and eye); "autorotate", if defined, may make the model automatically rotate on scene with a given RPM; "interactions:rotate", if defined, may allow the user to rotate the model by touch; "menustyle:right" may make the model menu to be displayed vertically on the right side of the scene; and "aliases" is a list of URL tails that trigger the presentation of this scene.

In one implementation, the description file is written according to a guideline, which may comprise parameter definitions and actions supported, and is based on the CLM packaging structure.

The description file may provide content menu and content control information to the content player 153, so that the first piece of AR content may be rendered by the content player 153. The present invention allows content control information to be defined during the content creation process, instead of the application development process, and can help to significantly simplify the entire process for distributing AR content.

The description file is the mechanism to inform the content player 153 that a piece of content is AR content (e.g., by providing a new media type defined as AR), and is the description of how the AR content should be displayed and the description of the model menu for manipulating the AR content, including where to display the model menu and how to interact with the AR content.

In one implementation, the description file is a metadata file that informs the content player 153 the content available for a slide. In one example, the description file may include information about media type, e.g., HTML slide, image, or the new media type AR.

The first piece of AR content and the description file may be packaged according to the CLM packaging structure. In one implementation, the description file is a representation of AR content that is available in the context of a single slide. In one example, the first piece of AR content and its description file may be packaged into a .zip file.

Figure 4:
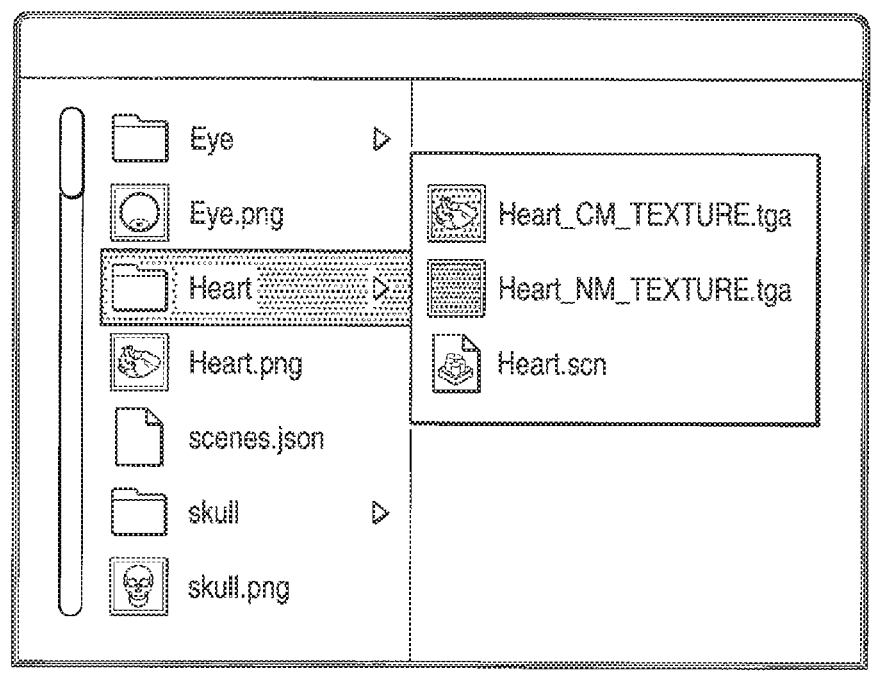
FIG. 4 illustrates an example user interface displaying packaged AR content documents according to one embodiment of the present invention.

FIG. 4 illustrates an example of packaged AR content documents. As shown, the AR content assets/models are saved in a zip file to the controlled content repository 102. Each model (e.g., eye, heart and skull) may have a thumbnail image and a folder that contains the model files. The description file, scenes.json, informs the content player 153 how to present the AR content.

At 311, alignment rules of the system 100 may be applied to the first piece of AR content to define how it can be accessed, including users who have access to it. In one implementation, the customer relationship management server 106 may apply the alignment rules.

At 313, an approval for distributing the first piece of AR content may be received, e.g., at the content management server 101.

At 315, the first piece of AR content and its description file may be distributed to the user computing device 150 from the controlled content repository 102. Metadata about the first piece of AR content may be included in the description file and sent to the computing device 150 from the controlled content repository 102. The metadata may include information about media type of the AR content, nature of the AR content, reference data, and data indicating the AR context.

At 321, a sales representative may meet a physician, and search the CRM subsystem 104 or the client database 154 in the user computing device 150 synchronized with the CRM subsystem 104 for the physician's information.

At 323, the physician's information may be returned.

At 325, a user interface for creating a call report may be displayed. One example of the user interface is shown in FIG. 5. As shown, the sales representative may click on the button "Record a Call" to start the call report.

The sales representative may want to share content with the physician during the meeting. He may look at a file folder, e.g., the file folder shown in FIG. 4, on his computing device. The first piece of AR content may be shown as a slide in the file folder. The sales representative may select the slide, and a request for displaying the first piece of AR content may be received (e.g., at the user computing device 150) at 327.

In one implementation, the first piece of AR content may be a picture of a key opinion leader ("KOL") speaker. The sales representative may try to invite a physician to an event, using his computing device (e.g., an iPad) to obtain real time video of an invitation and display the picture of the KOL speaker as AR content over the real-time video of the invitation.

Figure 6:
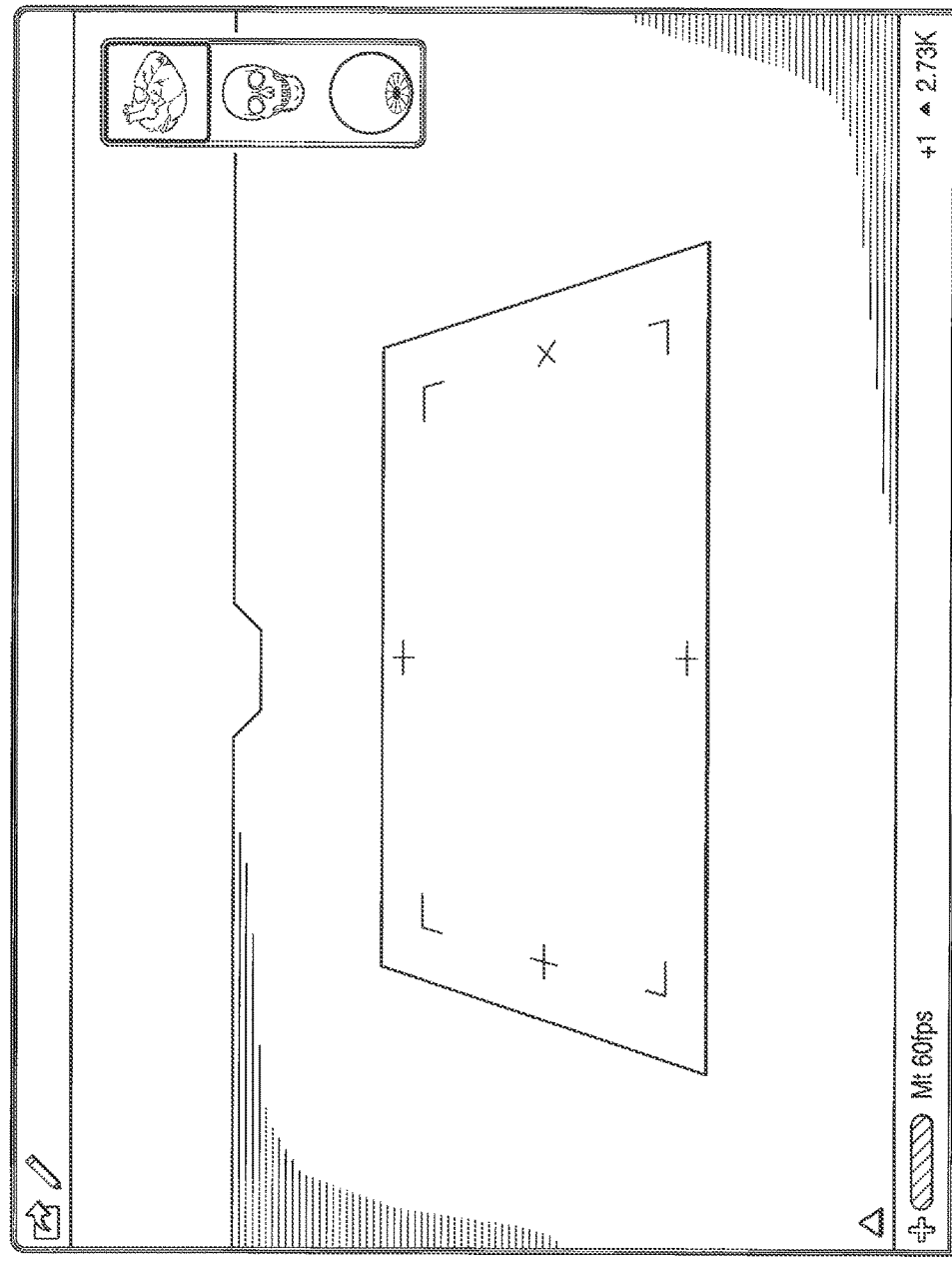
FIG. 6 illustrates an example screen with a menu of configurable AR models overlaid over a real-world environment video according to one embodiment of the present invention.

At 328, a menu of configurable AR models may be displayed, and the first piece of AR content (e.g., heart) may be displayed as a thumbnail in the model menu, together with two other AR content models (e.g., skull and eye), as shown in FIG. 6.

When the sales representative selects the first piece of AR content on the user interface 600, at 329, the first piece of AR content may be rendered by the content player 153, and sent to the AR controller 156.

Figure 7:
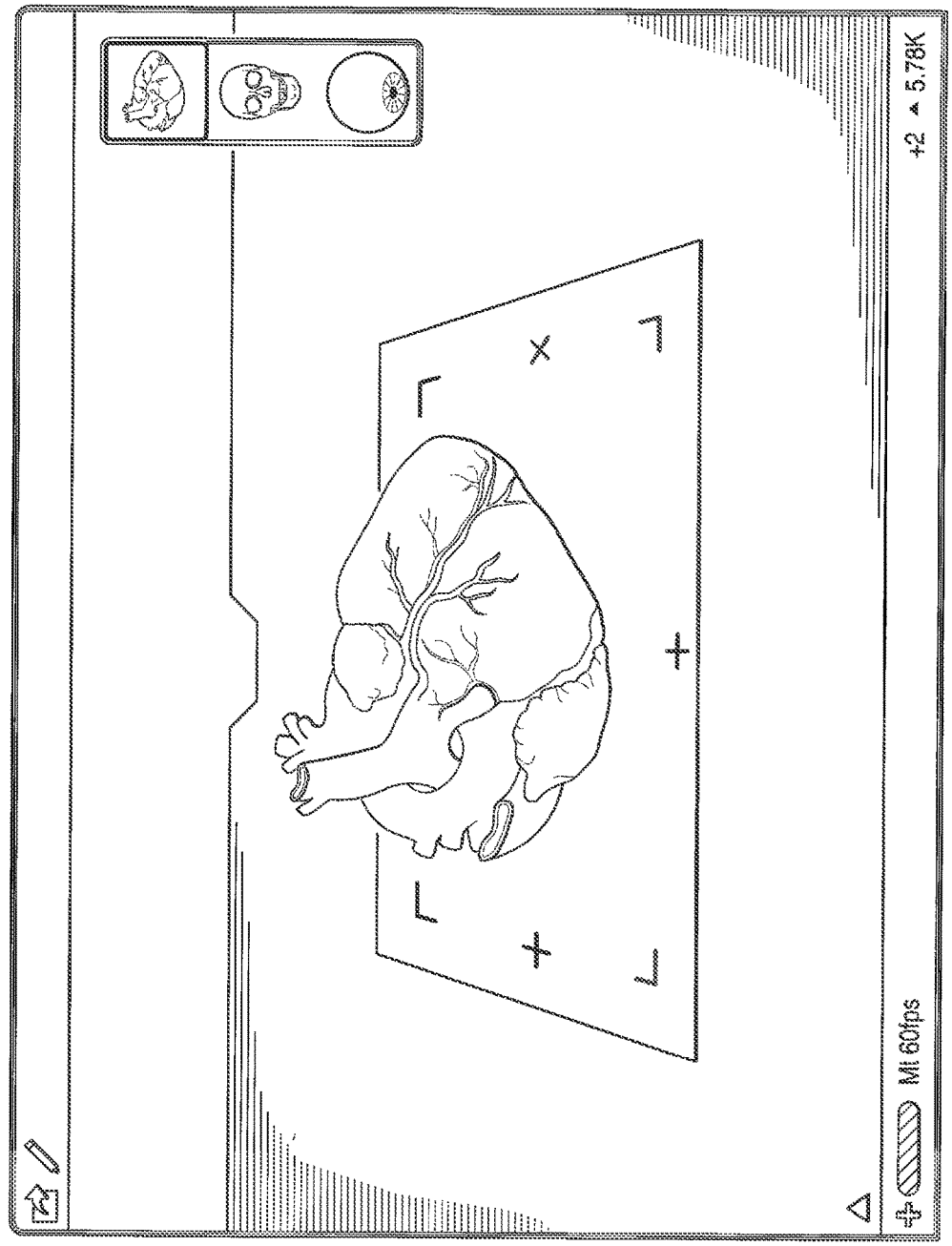
FIG. 7 illustrates an example screen with AR content overlaid over a real-world environment video according to one embodiment of the present invention.

At 331, the AR controller 156 may combine the first piece of AR content from the content player 153 and the real-time video from the camera 155. In one implementation, the first piece of AR content may be overlaid over the real-time video, as shown in FIG. 7.

At 333, a request for taking an action on the first piece of AR content may be received, e.g., on the user interface 700. The action may be, e.g., moving the first piece of AR content, zooming in or zooming out. The user may interact with a touchscreen of the computing device 150 to input the request.

Figure 8:
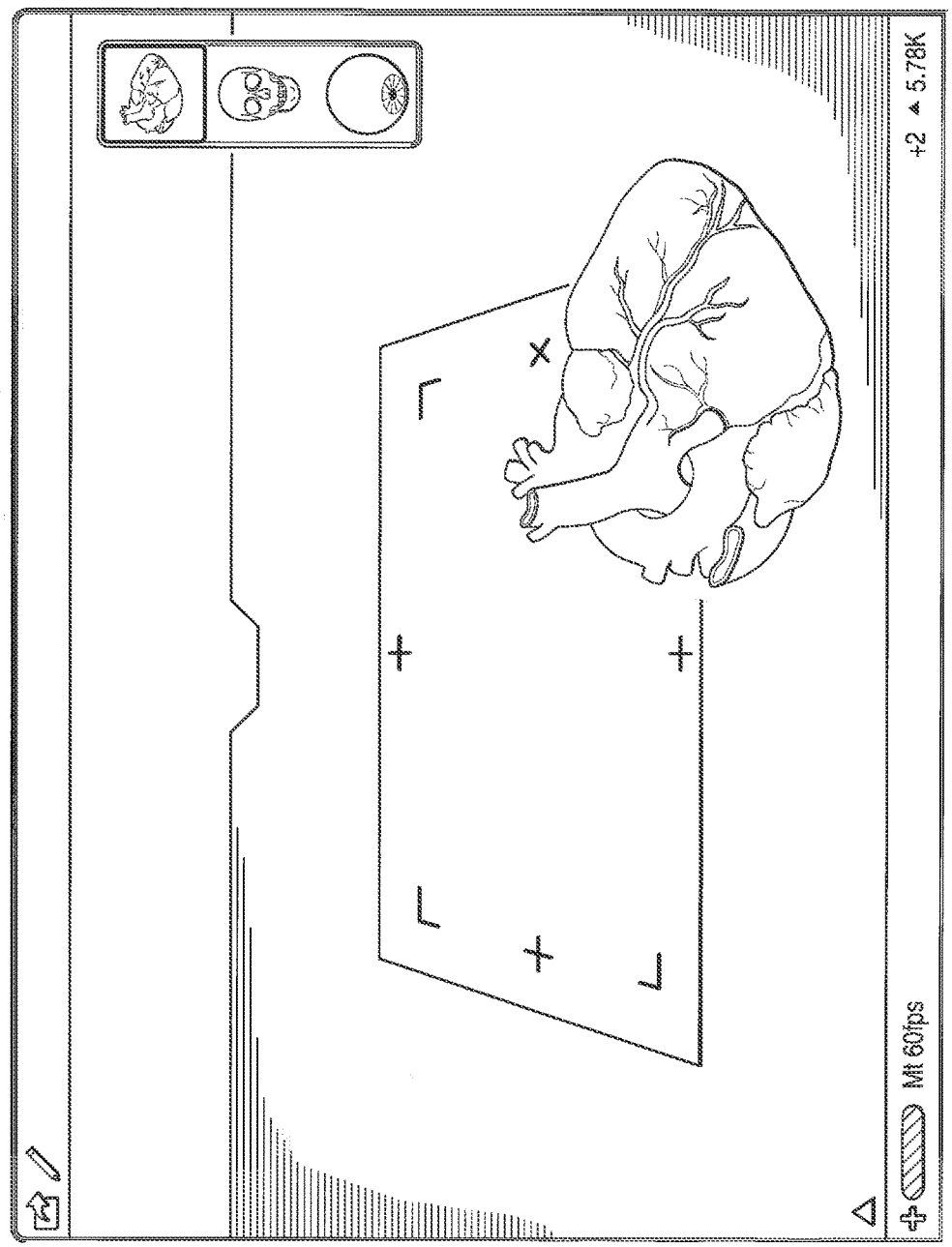
FIG. 8 illustrates an example screen with AR content overlaid over a real-world environment video according to one embodiment of the present invention.

At 335, the content player 153 may render the first piece of AR content again in response to the action request, and send the newly rendered first piece of AR content to the AR controller 156 to enable it to display the newly rendered first piece of AR content. As shown in FIG. 8, the AR content is moved according to the request.

At 337, a call report may be generated for the meeting, and may include information of the displayed AR content.

The flowcharts do not mean to limit the sequence of the steps.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A machine-implemented method for displaying AR content, the method comprising:
   receiving a first piece of AR content and a description file of the first piece of AR content from an AR content distribution system over a network, wherein the AR content distribution system comprises a controlled content repository and a customer relationship management (CRM) system, wherein the first piece of AR content and the description file of the first piece of AR content are packaged according to a first packaging structure of the AR content distribution system, wherein the first packaging structure of the AR content distribution system comprises a packaging structure of a closed loop marketing (CLM) system, wherein the description file of the first piece of AR content describes the first piece of AR content and defines interactions with the first piece of AR content in an AR environment, and wherein an access control rule of the CRM system is applied to the first piece of AR content to configure its accessibility by a first user and a second user; and
   storing the packaged first piece of AR content and the description file of the first piece of AR content in a local storage of a user computing device.

2. The method of claim 1, further comprising: receiving a request for displaying the first piece of AR content in an AR environment.

3. The method of claim 2, further comprising: enabling display of a menu of configurable AR models, wherein the first piece of AR content is displayed as a thumbnail in the menu of configurable AR models.

4. The method of claim 3, further comprising: receiving a request for displaying the first piece of AR content on the menu of configurable AR models, and rendering the first piece of AR content based on the first packaging structure.

5. The method of claim 4, further comprising: sending the rendered first piece of AR content to an AR controller to enable the AR controller to display the first piece of AR content in an AR environment.

6. The method of claim 5, further comprising: receiving on a user interface, which displays the first piece of AR content in an AR environment, a request for manipulating the first piece of AR content.

7. The method of claim 6, further comprising: re-rendering the first piece of AR content in response to the request for manipulating the first piece of AR content, and sending re-rendered first piece of AR content to the AR controller to enable the AR controller to display the re-rendered first piece of AR content in the AR environment.

8. The method of claim 6, wherein the request for manipulating the first piece of AR content comprises: moving the first piece of AR content, zooming in and zooming out.

9. The method of claim 5, further comprising: adding information of display of the first piece of AR content to a call report.

10. The method of claim 1, wherein the description file of the first piece of AR content is a JSON file.

11. The method of claim 1, wherein the description file of the first piece of AR content is a file for creating a content menu for controlling the first piece of AR content in the AR environment.

12. The method of claim 1, wherein the description file of the first piece of AR content defines a media type of the first piece of AR content to enable presentation of the first piece of AR content in the AR environment.

13. The method of claim 1, wherein the first piece of AR content and the description file of the first piece of AR content are packaged into a .zip file.

14. The method of claim 1, wherein the description file of the first piece of AR content comprises metadata of the first piece of AR content.

15. The method of claim 1, wherein the description file of the first piece of AR content is based on parameters of the first packaging structure.

16. An AR content controller for: receiving a first piece of AR content and a description file of the first piece of AR content from an AR content distribution system over a network, wherein the AR content distribution system comprises a controlled content repository and a customer relationship management (CRM) system, wherein the first piece of AR content and the description file of the first piece of AR content are packaged according to a first packaging structure of the AR content distribution system, wherein the first packaging structure of the AR content distribution system comprises a packaging structure of a closed loop marketing (CLM) system, wherein the description file of the first piece of AR content describes the first piece of AR content and defines interactions with the first piece of AR content in an AR environment; and wherein an access control rule of the CRM system is applied to the first piece of AR content to configure its accessibility by a first user and a second user.

17. The AR content controller of claim 16, further rendering the first piece of AR content in response to a request based on the first packaging structure.

18. The AR content controller of claim 17, further sending the rendered first piece of AR content to an AR controller to enable the AR controller to display the first piece of AR content in an AR environment.

* * * * *